Feb. 21, 1967  V. L. ROGALLO  3,304,773
FORCE TRANSDUCER

Filed March 26, 1964  5 Sheets-Sheet 1

INVENTOR.
VERNON L. ROGALLO
BY
ATTORNEYS

Feb. 21, 1967  V. L. ROGALLO  3,304,773
FORCE TRANSDUCER

Filed March 26, 1964  5 Sheets-Sheet 2

INVENTOR.
VERNON L. ROGALLO
BY
ATTORNEYS

Feb. 21, 1967 V. L. ROGALLO 3,304,773
FORCE TRANSDUCER
Filed March 26, 1964 5 Sheets-Sheet 3

INVENTOR.
VERNON L. ROGALLO
BY
ATTORNEYS

Feb. 21, 1967  V. L. ROGALLO  3,304,773
FORCE TRANSDUCER
Filed March 26, 1964  5 Sheets-Sheet 4

INVENTOR.
VERNON L. ROGALLO
BY
ATTORNEYS

Feb. 21, 1967  V. L. ROGALLO  3,304,773
FORCE TRANSDUCER
Filed March 26, 1964  5 Sheets-Sheet 5

INVENTOR.
VERNON L. ROGALLO
BY
ATTORNEYS

United States Patent Office 3,304,773
Patented Feb. 21, 1967

3,304,773
FORCE TRANSDUCER
Vernon L. Rogallo, Los Altos, Calif., assignor to the United States of America as represented by the National Aeronautics and Space Administration
Filed Mar. 26, 1964, Ser. No. 355,129
20 Claims. (Cl. 73—141)

The invention described herein may be manufactured and used by or for the Government of the United States of America for governmental purposes without the payment of any royalties thereon or therefor.

This invention relates to transducers and more particularly to transducers which are capable of detecting and measuring extremely small forces.

The general object of the invention is to provide an improved transducer which is extremely versatile and capable of use in many fields.

More specifically, one of the objects of the invention it to provide a transducer which can be used as a micrometeoroid detector, that is, an instrument for detecting and measuring the momentum of extremely small particles traveling through space. As an example of the extreme sensitivity required of a micrometeoroid detector and achieved by the present invention, a transducer constructed according to the invention is sensitive to forces of the order of a microgram, or momentum of the order of $10^{-5}$ dyne seconds. The degree of sensitivity is even more fully understood when it is realized that a momentum of $10^{-5}$ dyne seconds is equal to $\frac{1}{1000}$ of the momentum achieved by a grain of table salt weighing $150 \times 10^{-6}$ grams when dropped from a height of $\frac{3}{8}''$.

An additional object of the invention is to provide a transducer capable of measuring impact or pulse forces applied against a target and at the same time capable of measuring acceleration. Accordingly, a transducer constructed according to the invention is usable as an accelerometer and as a seismograph in addition to being usable as a micrometeoroid detector.

A further object of the invention is to provide a transducer and method of using the same which makes it possible to calibrate the device remotely, such as from earth to an unmanned space vehicle in flight.

In connection with use as a micrometeoroid detector or detection of other scattered impacts, an object of the invention is to provide a transducer having a target area and arranged so that the device has uniform sensitivity over the entire target area so that impact of a given momentum will give the same recording regardless of where on the target impact takes place. Also in connection with momentum measurement a further object of the invention is to provide a transducer having a target constructed to give a momentum accommodation coefficient of one so that momentum transfer efficiency is well established.

Additional objects of the invention are to provide a transducer having the following features which make it capable of performing a wide variety of uses. One feature is that the device be operable under gravitational force; another feature is that the device have a rapid decay time after impact to allow measurement of separate impacts in close sequence. An additional feature is that the device be sufficiently rugged to withstand high g loads during off-design conditions. A further feature is that the device have a high degree of stability for long periods of time. An additional feature is that the device be calibratible in the laboratory under 1 g conditions.

Another feature of the invention is to provide a transducer which will be capable of detecting and recording both the magnitude and the direction of force.

By way of brief description, a transducer according to one specific embodiment of the invention, comprises a base plate with a support post extending upwardly therefrom. A pair of piezoelectric beams are mounted one above the other in rigid attachment to the support post. A movable member is connected to the free ends of the beams and transmits to the beams the force which is to be detected and measured. Bending of the beams by the movement of said movable member generates an electrical output and the magnitude of that output is a measurement of the amount of movement of the movable member and therefore the amount of force which was transmitted to the movable member.

The preceding objects and features of advantage, together with others, will become more clearly apparent from the following detailed description, wherein reference is made to the accompanying drawings in which.

Figure 1:
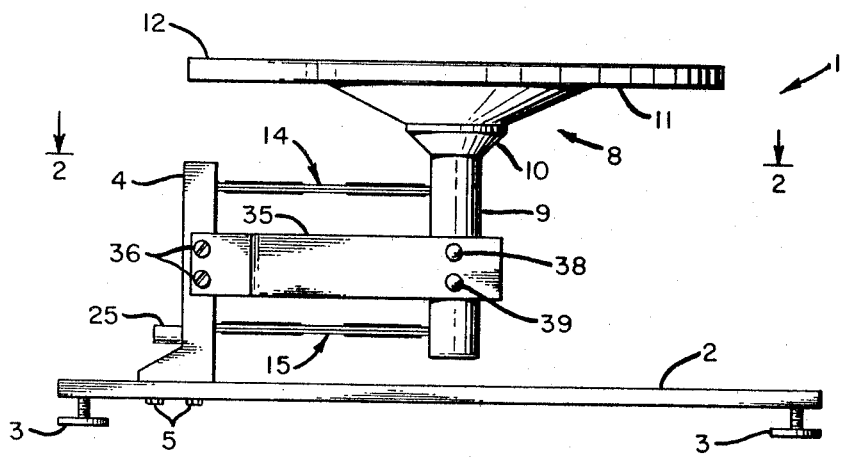
FIGURE 1 is a side elevational view of a transducer according to the invention.

Referring in more detail to the drawings, FIG. 1 shows a transducer 1 comprising a base plate 2 supported on legs 3. The transducer has a support post 4 which is rigidly mounted on the base plate and is held in place by bolts 5. The movable member of the transducer is designated generally at 8 and comprises an attachment rod portion 9 having an attachment head 10. In FIG. 1 a collector or target plate 11 is mounted on the attachment head. The target plate 11 may be removed or replaced by other units depending upon the desired use of the transducer. The target plate is employed primarily when the transducer is used to record micrometeoriod or similar impacts.

The movable member and, in particular, the target 11 must be very rigid to give uniform sensitivity for impact anywhere on the target surface. In addition the mass of the entire movable member must be low to insure high sensitivity and rapid decay. One suitable construction is to make the entire target element 11 out of metal honeycomb employing a light-weight metal such as aluminum, magnesium or beryllium and arranging the honeycomb passages vertically. The exterior of the honeycomb can be sheathed in a thin metal casing and a thin metal disk can be employed to cover the top surface. When the apparatus is to be employed to detect and measure micrometeoroid and similar impacts it is desirable to coat the surface of the target with a layer 12 of plastic such as polyethylene. The reason for the plastic coating is that it has been found that such a coating improves the energy transfer and provides a momentum accommodation coefficient of 1. The attachment rod 9 and head 10 are also preferably made of a strong, light metal such as aluminum magnesium or beryllium and in some cases it is desirable to put lightening holes in these members. Another desirable construction is to make members 9–11 as an integral unit.

Figure 4:
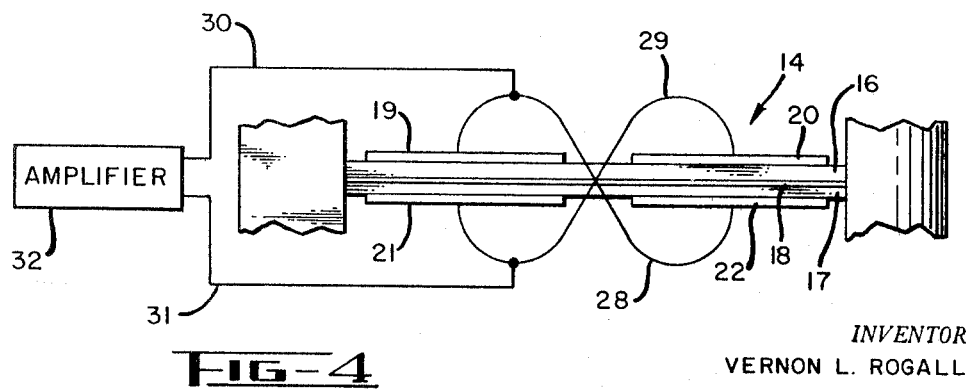
FIGURE 4 is an enlarged view of one of the piezoelectric beams and a suitable electrical connection thereto.

The movable unit 8 is mounted on two beams 14 and 15. The beams are spaced one above the other with their left ends securely attached to the support post 4. The right ends of the beams are securely attached to the side of the attachment rod 9. A suitably rigid connection for the ends of the beams has been found to be provided by the use of an epoxy adhesive. The beams 14 and 15 are identical and a particularly suitable type of beam is shown in the enlarged FIG. 4. The important point is that means be provided for measuring deflection of the beams. A preferred type of beam is a conventional piezoelectric bimorph construction comprising upper and lower crystalline ceramic strips 16 and 17 separated by a central metal electrode strip 18. For example, the "PZT-Bimorph" beam made by Clevite Electronic Components Division of Clevite Corporation can be used. Any ferroelectric material which exhibits piezoelectric effects in bending can be employed. As used throughout the specification and claims the term piezoelectric beam means a beam which has the property of generating electrical charge under the influence of mechanical bending forces and the property of producing mechanical bending forces under the influence of electrical voltage. Separate metal electrodes 19 and 20 are coated on the upper strip 16 and separate metal electrode strips 21 and 22 are coated on the bottom surface of the bottom strip 17. Lead wires, which are too small to be visible in the scale of FIG. 1, are connected to the electrodes 19–22 for both of the beams. It has been found convenient to connect all of the lead wires to an electrical connector fitting 25. One suitable wiring arrangement is shown in FIG. 4 for one of the beams. More specifically, electrodes 19 and 22 are connected together by a wire 28, and electrodes 20 and 21 are connected together by a wire 29. Wires 28 and 29 can then be connected by leads 30 and 31 to a conventional amplifier 32. Electrodes 19–22 can obviously be connected to the amplifier in different ways than shown in FIG. 4. The arrangement shown in FIG. 4 was selected to provide a large capacitance into the amplifier. Although the output of both of the beams 14 and 15 can be connected to the amplifier, very satisfactory results have been obtained using the output of only one of the beams.

Figure 5:
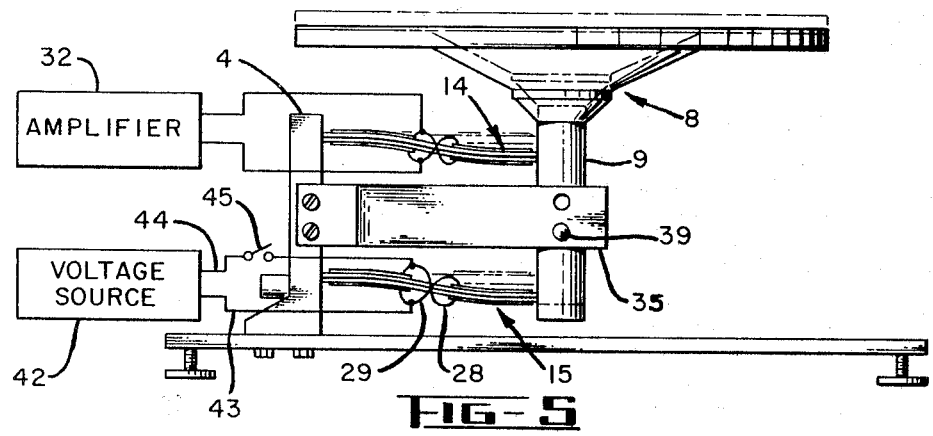
FIGURE 5 is a side view similar to FIG. 1 but showing the motion of the transducer in operation, and also containing a schematic showing of a connection for utilizing the built-in calibration feature of the transducer.

FIG. 5 shows the type of motion experienced by the transducer under impact and in addition provides a schematic showing for an arrangement whereby the built-in calibration feature of the apparatus can be employed. As shown in FIG. 5 the movable member 8 follows a straight line motion due to the pantograph-like nature of the structure formed by the support post 4, beams 14 and 15 and the attachment rod 9. It should be understood that in order to depict the multiple thickness of each of the beams and the plural electrodes thereon, it has been necessary to greatly exaggerate the thickness of the beams as viewed in the drawing figures. In actuality the beams are very thin in the dimension viewed from the side as in FIG. 1 and are relatively very wide in the dimension viewed from the top as in FIG. 2. In this manner the beams provide extreme sensitivity to motion of the movable member 8 along a vertical line, and at the same time the beams present substantial resistance to motion in any other direction.

Figure 2:
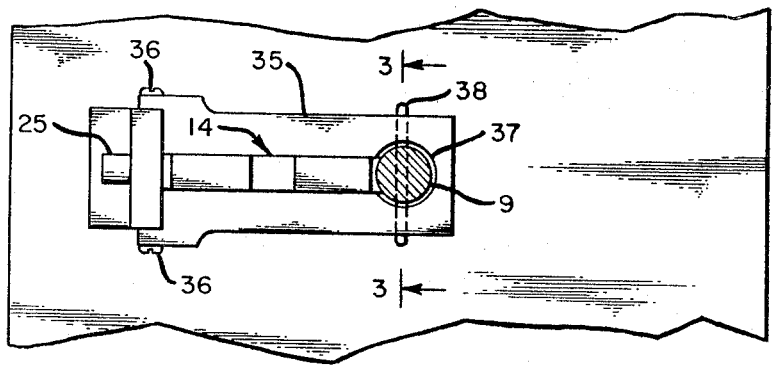
FIGURE 2 is essentially a top view on the line 2—2 of FIG. 1 with part of the base plate cut away.
Figure 3:
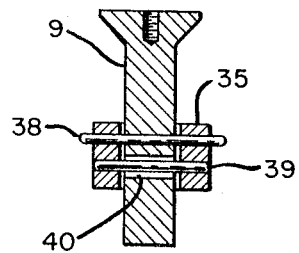
FIGURE 3 is a cross-sectional view taken on the line 3—3 of FIG. 2 showing the details of a locking and limit arangement.

In order to provide the apparatus with its feature of ruggedness, a stop member 35 is attached to the support post 4 by means of screws 36. The stop member 35 is provided with a bore 37 which receives the attachment rod 9 of the movable member 8. Bore 37 is substantially oversized for the rod 9 so as not to interfere with vertical motion of rod 9 when the apparatus is in use. The stop member 35 is also provided with two horizontal passages which intersect the vertical passage 37. The attachment rod 9 is provided with similarly arranged horizontal passages. Pins 38 and 39 can be inserted through the horizontal passages in the stop member and attachment rod. Pin 38 fits snugly in its passages to prevent any movement at all of the movable member 9. Pin 38 is employed only when the apparatus is not in use as shown in FIGS. 1–3 and prevents the apparatus from any possible damage due to shock forces caused by rough handling, transportation, or otherwise. In contrast, pin 39 is employed even while the apparatus is in use. Pin 39 is snugly received in the stop member 35 but is received in a substantially oversized passage 40 in the attachment rod 9. As a result of the construction previously described it will be seen that the movable member 9 is extremely free for the limited vertical movement required in operation, being restrained only by the extremely thin cantilever beams 14 and 15. At the same time the delicate beams 14 and 15 are protected against overload damage by means of the arrangement of stop member 35 and pin 39 during operation and by pin 38 when not in operation. It should be understood that if desired a metal shield can be placed entirely around the apparatus to protect it from dirt and to protect the electrodes from stray electrical fields, the only requirement, of course, being that the shield have an oversized aperture through which the attachment rod 9 can oscillate.

In addition to depicting the motion of the apparatus, FIG. 5 also shows schematically an arrangement for practicing one of the method objects of the invention, more specifically the method of calibrating the apparatus remotely so that it can be calibrated, for example, while in flight on an unmanned space craft. The calibration is accomplished by connecting an adjustable voltage source 42 to the wires 28 and 29 of one of the beams through leads 43 and 44. The source 42 may, for example, generate an A.-C. voltage, a constant D.-C. voltage, or a series of pulses. The other beam is connected as in FIG. 4 to an amplifier 32. As is well known in the art, the piezoelectric beams 14 and 15 can be used to generate voltage by physical displacement or conversely can be displaced by voltage input.

This phenomenon is employed in the calibration technique wherein the beam 15 is charged with a known voltage potential. When a constant D.-C. voltage is used for calibration, it physically deflects the system including the movable member 8 to a fixed position and holds it there as long as the potential is maintained. The initial deflection of the system will, of course, bend the beam 14 and cause a votage output which is a direct measurement of the amount of displacement of the movable member. Thus, voltage output can be plotted against voltage input. Upon discharge of the input voltage the system will vibrate. This physical vibration again generates a voltage output of the upper beam 14 which is again a measure of the original displacement. The action of the vibratory motion is an output particularly similar in character to a true impact, and it is actually preferred to plot against input voltage the peak output of this vibration rather than the output caused by the initial deflection. Similarly, an A.-C. or pulse voltage will cause the system to vibrate, and the peak of the output voltage can be measured and plotted against input voltage. In any of these cases the plot shows a voltage output which corresponds to a given voltage input under given environmental conditions. This is obviously not an absolute calibration. However, the electrical-input calibration can be referred to an absolute calibration under the same environmental conditions. Thus, by dropping beads of known weight from known height and reading the output, the output can be plotted against actual momentum. In this way it is known that for a given environment a given voltage input gives a given voltage output, which output is also given by an impact of given momentum. In a specific actual construction of a transducer as shown in FIG. 1, a plot on log paper of actual impact against voltage output formed a straight line, and a plot of voltage input against voltage output also formed a straight line. When it is desired to calibrate the apparatus in subsequent use it is only necessary to impart known voltage input and record the voltage output. If the output is less (or more) for a given voltage input than it was in the test environment, then it will be known that the output caused by an actual impact in the new environment will be proportionally less (or more) than the output caused by an impact of the same magnitude under the test environment.

For example, assume that under the test environment an output reading of .05 volt is given both by a .1 volt input and by an actual momentum impact of .02 dyne-second. Then assume that in the actual environment of use, involving for example a substantially different temperature, that an output reading of .05 volt requires a 1.0 volt input, indicating that the system is 10 times stiffer. It will therefore be known that an output reading of .05 volt in the use environment will indicate an actual impact of .2 dyne-second. Thus, by having previously related true impacts in a test environment to the response for known voltages, a remote calibration can be made by transmitting a signal with conventional equipment which causes the voltage 42 to be connected and then disconnected from the lower beam 15, as by the switch 45, and preferably also varies the voltage over a range to obtain several check points.

Figure 6:
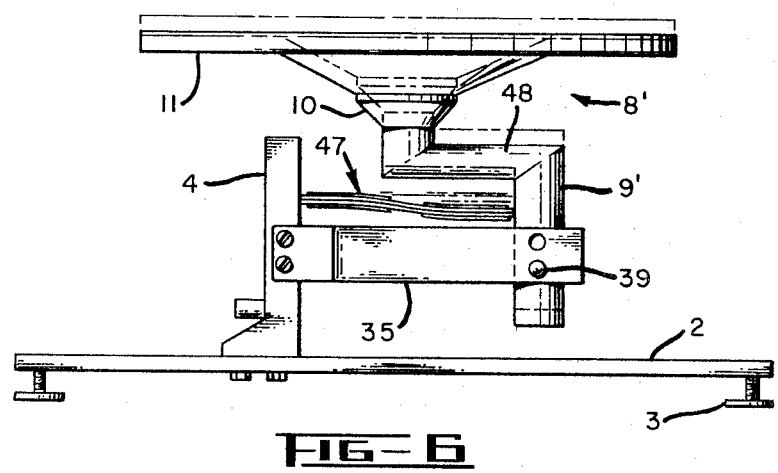
FIGURE 6 is a side view similar to FIG. 1 but showing a modified embodiment of the invention, and also showing motion of the modified embodiment.

FIG. 6 shows a modified form of the apparatus. In the embodiment shown in FIG. 6 the various parts which are identical to parts in FIG. 1 are designated by the same reference numbers, and parts which are similar are designated with primed reference numbers. Thus, FIG. 6 is the same as FIG. 1 insofar as base 2, support post 4, and stop member 35. The beam construction in FIG. 6 differs from that of FIG. 1 in that only a single beam 47 is employed in FIG. 6. Beam 47 is identical in construction to either of the beams 14 or 15 of FIG. 1. In addition to the single beam difference, the embodiment of FIG. 6 differs in the arrangement of the movable member 8'. Member 8' has the same attachment head 10 and the same target 11 as in FIG. 1 and also has a very similar attachment rod 9'. However, in FIG. 6 the connection between the attachment rod 9' and the attachment head 10 incorporates an offset portion 48. In this manner the center of mass of the movable member 8' is positioned substantially in line with the center of the beam. As a result the movable member 8' in FIG. 6 moves along a straight vertical line. If in the single beam construction of FIG. 6 the movable member 8' were mounted with its center of mass directly above the extreme right end of the beam 47, then as the target 11 moved downwardly under an impact it would tilt clockwise as viewed in FIG. 6 and the beam 47 would experience a single-curve bend. It should be noted at this point that the beams 14 and 15 in FIG. 1 and the beam 47 in FIG. 6 all experience a double-curve bend because of the straight-line motion of the movable members 8 and 8'. Conventional piezoelectric beams as shown and described in particular in FIG. 4 employ only a continuous single upper electrode in place of the two electrodes 19 and 20 employed in the invention and only a single continuous lower electrode in place of the electrodes 21 and 22. The reason that the invention employs double electrodes top and bottom is that single electrodes would experience equal and opposite forces at their opposite ends, which forces would cancel and result in a zero output. More specifically, it will be noted in FIGS. 5 and 6 that the upper left portion and the lower right portion of each beam is in tension and the lower left portion and upper right portion of each beam is in compression. As is well known in the art, placing a piezoelectric member in compression provides a signal of one polarity whereas placing a piezoelectric member in tension provides a signal of opposite polarity. It is for this reason that the invention requires separate electrodes on the top of each beam and separate electrodes on the bottom of each beam.

Figure 7:
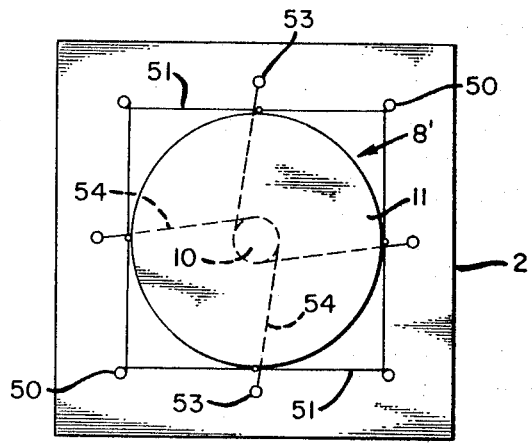
FIGURE 7 is a top view on reduced scale of FIG. 6 and showing the addition of a tethering arrangement which is desirable for some applications.

As previously explained, the embodiment of FIG. 6 is extremely sensitive and is therefore capable of detecting and measuring extremely small forces. At the same time the embodiment of FIG. 6 is very subject to lateral deflection. A slightly modified version of FIG. 6 is shown in FIG. 7 and employs means for resisting lateral deflection. As shown in FIG. 7 the lateral deflection can be resisted by means of thin wires attached to the movable member in such a way as to prevent lateral movement without appreciably resisting the small degree of vertical movement required by the apparatus in actual use. More specifically, the modification of FIG. 7 employs 4 vertical posts 50 mounted on the base 2. A thin wire 51 is stretched around the post 50 so that it makes tangent contact with 4 points on the periphery of the target 11 and is bonded to the target at these tangent points. Four more posts 53 are attached to the base 2 intermediate to post 50. A separate length of wire 54 is connected from each post 53 to a tangent point on the periphery of the attachment head 10 and is there bonded to the head. It will be seen that lateral motion in any direction will place one or more of the wires 51, 54 directly in tension and thus prevent such motion. However, small vertical movement of the movable member 8' will not necessitate any appreciable change in the length of any of the wires and therefore will not involve any appreciable resistance to movement. Incidentally, the degree of deflection shown in FIGS. 5 and 6 is greatly exaggerated to show the type of motion involved. In actual practice pin 39 and bore 40 would be designed to prevent such extreme motion.

Figure 8:
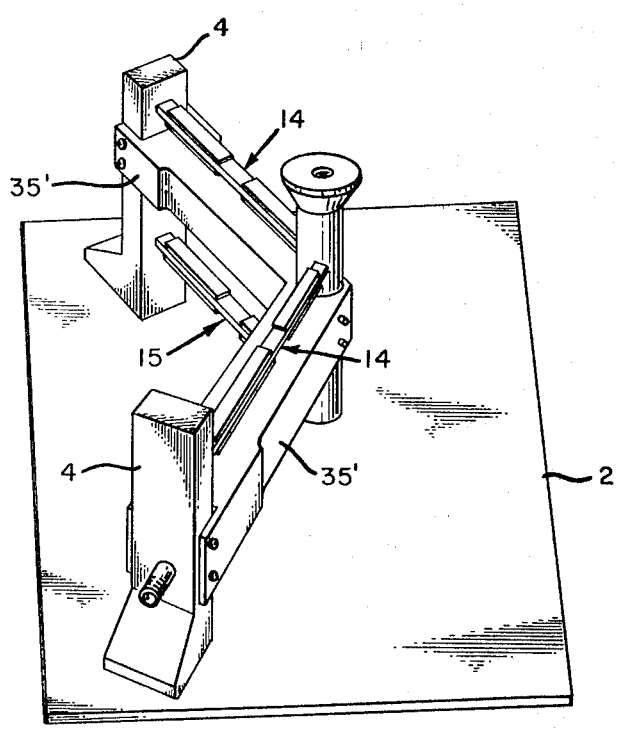
FIGURE 8 is a perspective view showing an arrangement similar to the transducer of FIG. 1 but having two sets of support beans.

FIG. 8 shows another arrangement for ruggedizing the apparatus without appreciably reducing its sensitivity. The arrangement in FIG. 8 is shown specifically for the type of embodiment of FIG. 1 but is also obviously applicable to the embodiment of FIG. 6. In FIG. 8 the parts which are identical to parts in FIG. 1 are given the same reference numbers, and parts which are similar are given primed reference numbers. In essence, the embodiment in FIG. 8 is the same as the embodiment in FIG. 1 except that FIG. 8 employs two sets of beams 14 and 15, the beams being arranged in two vertical planes set at an angle to each other. It is important to note that the angle between the two sets of beams is other than 180°. If the two sets of beams were arranged 180° from each other, that is directly opposite each other, the sensitivity of the apparatus would be greatly impaired. The arrangement shown in FIG. 8 involves two support posts 4 each having upper and lower beams 14 and 15, although only the upper beam is visible in the right hand units. The only modified element in FIG. 8 is the V-shaped stop member 35' which is common to both of the support posts 4.

Figure 9:
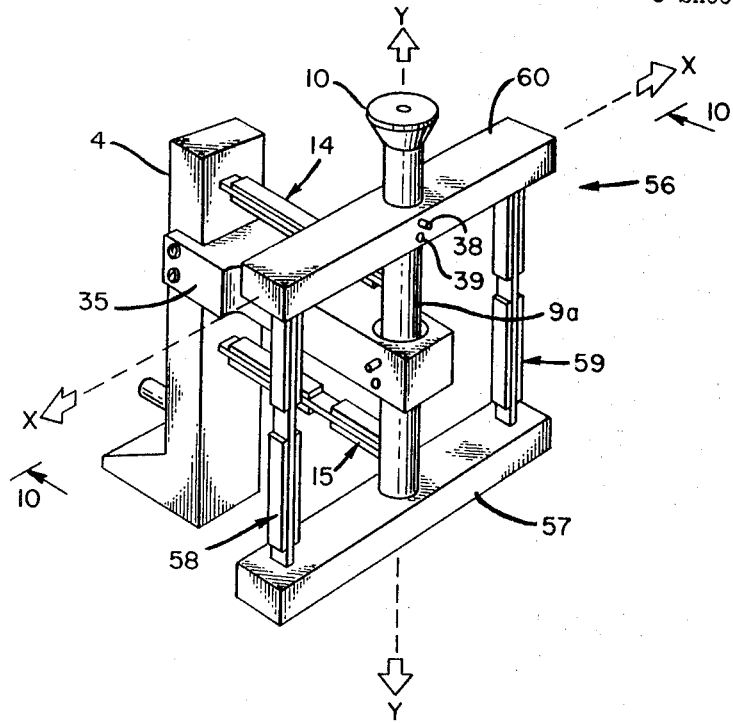
FIGURE 9 is a perspective view which omits the base plate and shows an arrangement for detecting and measuring forces along two axes.

FIG. 9 is a modified transducer which provides for measuring components of force along two axes. More specifically the component of force along the vertical or Y axis can be measured, and in addition the component of force along the horizontal X axis can also be measured. The construction of FIG. 9 has a basic similarity to FIG. 1 and parts which are identical are given the same reference numbers. In FIG. 9 the support post 4 is the same as the support post 4 in FIG. 1, and the piezoelectric beams 14 and 15 are also the same. However, the movable member 56 in FIG. 9 incorporates a second piezoelectric beam system. More specifically the attachment rod 9a is connected to a lower bar 57 to form therewith a T-shaped member. Two piezoelectric beams 58 and 59 have their lower ends attached to the ends of bar 57 and their upper ends attached to the ends of a bar 60. The upper end of rod 9a is not attached to bar 60 but fits into an oversized bore 61 in the bottom of bar 60 for ruggedizing the structure. Pins 38 and 39 are provided through bar 60 and rod 9a for the same purpose as pins 38 and 39 in stop member 35. It should be emphasized that rod 9a and bar 60 are completely free to move relative to each other in all directions except as limited to prevent overload. The attachment head 10 is connected to the center of the upper bar 60. Beams 58 and 59 are constructed exactly the same as beams 14 and 15.

As will be obvious from FIG. 9, beams 14 and 15 are oriented to be deflected by and measure forces along the Y axis. Similarly beams 58 and 59 are oriented to be deflected by and measure forces along the X axis. Thus, when an impact is received on a target 11 (not shown in FIG. 9) the force will be transmitted through the head 10 and bar 60 to push down through beams 58 and 59 and force bar 57 downwardly. This downward movement carries rod 9 and deflects beams 14 and 15 to measure the component of the force along the Y axis. If the original impact also had a component of force along the X axis, that component would move bar 60 along the X axis to deflect beams 58 and 59 and measure the X component of the force.

Figure 11:
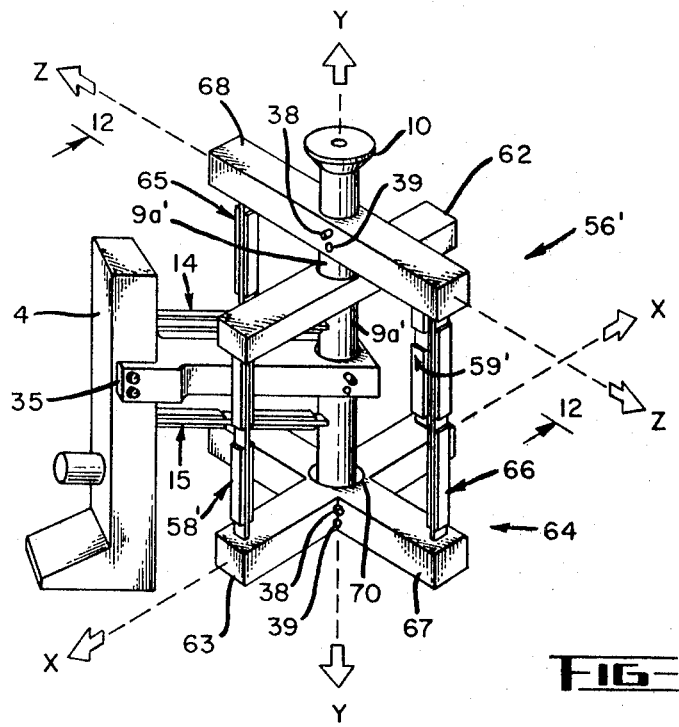
FIGURE 11 is a perspective view similar to FIG. 9 but showing an arrangement for detecting and measuring forces along three axes.
Figure 12:
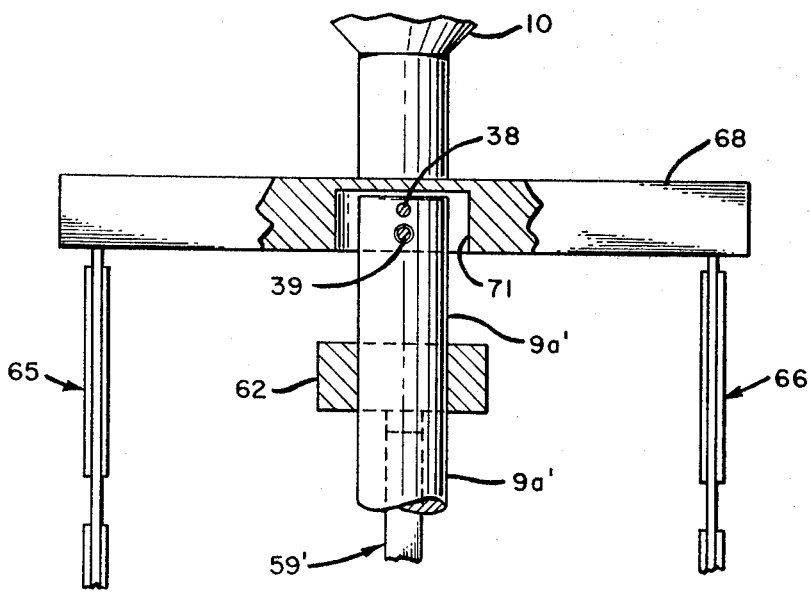
FIGURE 12 is an elevational view of a portion of the transducer of FIG. 11 looking along the X—X axis.

FIG. 11 shows still another embodiment of the transducer. The embodiment of FIG. 11 is similar to that of FIG. 9 but adds the provision for measurement of forces along a third axis. Thus, FIG. 11 provides for the separate measurement of forces along the X, Y and Z axes. In FIG. 11 the parts which are the same as in FIG. 9 are given the same reference numbers and parts which are similar are given primed reference numbers. In FIG. 11 the movable member 56' comprises a support rod 9a' which is connected to the attachment head 10 through the medium of two sets of piezoelectric beams. More specifically, the upper end of rod 9a' projects through and is rigidly attached to a bar 62. Beams 58' and 59' have their upper ends connected to bar 62 adjacent the ends of bar 62, and their lower ends connected adjacent the ends of one leg 63 of a cross-shaped, force transmitting member 64. Two additional piezoelectric beams 65 and 66 have their lower ends attached adjacent the ends of the other leg 67 of the cross-shaped member 64. The upper ends of beams 65 and 66 are attached adjacent the ends of an upper bar 68 which carries the attachment head 10. In order to ruggedize the transducer of FIG. 11, the lower end of rod 9a' fits into an oversized bore 70 in member 64, and the upper end of rod 9a' fits into an oversized bore 71 in bar 68. Pins 38 and 39 are provided for both of the bores 70 and 71 for the same purpose as pins 38 and 39 in stop member 35. It should be emphasized that rod 9a' is not connected to member 64 or bar 68, except to the extent provided by pins 38 and 39. The beams 65 and 66 are exactly the same as beams 14 and 15 and beams 58' and 59'.

Figure 10:
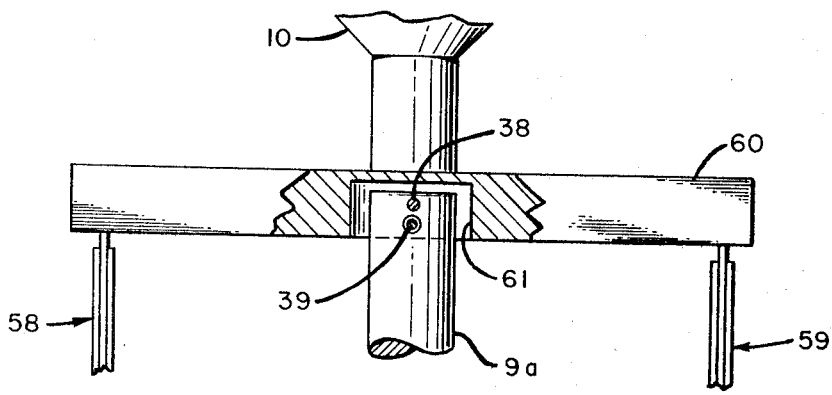
FIGURE 10 is an end view of a portion of the transducer of FIG. 9, looking toward the support post.

As is obvious from FIG. 11, beams 14 and 15 are oriented to be deflected by and measure forces along the Y axis; beams 58' and 59' are oriented to be deflected along the X axis; and beams 65 and 66 are oriented to be deflected along the Z axis. Thus, when an impact is received on a target 11 (not shown in FIG. 10) the force will be transmitted through the head 10 and bar 68 to push down through beams 65 and 66 and force the cross-shaped member 64 downwardly. This downward movement pulls down on beams 58' and 59' to move bar 62 and attachment rod 9 downwardly and thus deflects beams 14 and 15 to measure the components of the force along the Y axis. If the original impact also has a component of force along the X axis, that component will be transmitted through bar 68 and through the wider, undeflecting dimensions of beams 65 and 66 to move the cross-shaped member 64 along the X axis. This movement along the X axis will deflect beams 58' and 59' to measure the X axis force. If the original impact also has a component of force along the Z axis that component will move bar 68 along the Z axis to deflect beams 65 and 66 and thus measure the Z component of the force. The member 64 is held against movement along the Z axis by the wider, undeflecting dimensions of beams 58', 59' and 14, 15. Thus, a three component force will cause an output voltage from all three sets of beams. These three output voltages when resolved provide information as to the magnitude of the momentum of the impacting particle and the direction at which the particle struck the target.

Another feature of the invention is that it provides a transducer construction which is particularly adapted for use with a twin transducer to cancel out unwanted vibrations. For example in connection with FIG. 1, it is simply necessary to provide a second support post 4 carrying an exact duplicate of the structure carried by post 4 in FIG. 1, except that on the twin transducer the attachment head 10 and target 11 are on the bottom of rod 9, or are replaced by a small dense dummy volume of equal mass. The twin transducer is arranged so that its rod 9 is parallel to and as close as possible to the rod 9 in FIG. 1. Thus, any extraneous vibrations will be equally detected by both the original and the twin, and the output from the twin can be subtracted from the output of the original to cancel out all vibrations except those caused by the impacts which strike only the original target in FIG. 1.

Although preferred embodiments of the present invention are shown and described herein, it is to be understood that modifications may be therein made without departing from the spirit and scope of the invention as set forth in the appended claims.

Having thus described the invention, what is claimed as new and desired to be secured by Letters Patent is:

1. A force transducer comprising a support, a first set of two piezoelectric beams each having one end connected to said support the beams of said first set being spaced one above the other in a first vertical plane, a T-bar having the stem of the T connected to the other ends of the beams of said first set, a second set of two piezoelectric beams extending vertically from the opposite arms of said T in a second vertical plane, a connecting bar attached to the other ends of the beams of said second set, and a force-receiving target plate supported by said connecting bar.

2. A transducer as claimed in claim 1 in which the free end of the stem of the T is received in an oversized hole in said connecting bar.

3. A transducer as claimed in claim 2 in which a pin passes through said stem of the T and said bar and is received in an over-sized hole in one of said stem and said bar.

4. A force transducer comprising a support, a first set of two piezoelectric beams each having one end connected to said support, the beams of said first set being spaced one above the other in a first vertical plane, a T-bar having the stem of the T connected to the other ends of the beams of said first set, a second set of two piezoelectric beams extending vertically from the opposite arms of said T in a second vertical plane, a force-transmitting member connected to the other ends of the beams of said second set, a third set of two piezoelectric beams extending vertically from said force-transmitting member in a third vertical plane normal to said second plane, a connecting member attached to the other ends of the beams of said third set, and a force-receiving target plate supported by said connecting member.

5. A transducer as claimed in claim 4 in which the free end of said T is received in an oversized hole in said force-transmitting member.

6. A transducer as claimed in claim 4 in which said T-bar has an extension thereon received in an oversized hole in said connecting member.

7. A transducer as claimed in claim 6 in which the free end of said T is received in an oversized hole in said force-transmitting member.

8. A transducer as claimed in claim 4 in which the beams of said first set are vertically positioned between the top of said T and said force-transmitting member.

9. A transducer as claimed in claim 8 in which the top of said T is positioned below said connecting member.

10. A force transducer comprising a support, a first set of two piezoelectric beams each having one end connected to said support, the beams of said first set being spaced one above the other in a first vertical plane, a vertical attachment member connected to the other ends of the beams of said first set, a laterally extending member connected to the lower portion of said attachment member, a second set of two piezoelectric beams extending vertically upward from the opposite ends of said laterally extending member, a connecting member attached to the other end of the beams of said second set, said connecting member being spaced above the upper end of said attachment member, and a force-receiving target plate supported by said connecting member.

11. A force transducer comprising a support, an attachment member, a flexible piezoelectric beam having its ends connected to said support and said attachment member, respectively, output electrodes secured to opposite surfaces of said beam, a target for receiving impinging forces, said target being supported by said attachment member and free to move in a direction perpendicular to said unflexed beam, means for moving said target in a direction perpendicular to said unflexed beam including a flexible member connected between said support and said attachment member.

12. A force transducer comprising a support, an attachment member, a flexible piezoelectric beam having its ends connected to said support and said attachment member, respectively, electrodes secured to opposite faces of said beam, a target for receiving impinging forces, said target being supported by said attachment member and free to move in a direction orthogonal to said unflexed beam, said impinging forces causing said beam to flex with a double curve and generate voltages at said electrodes, and means for moving said target in a direction orthogonal to said unflexed beam including electromechanical transducing means connected between said support and said attachment member.

13. A force transducer comprising a support, an attachment member, a flexible piezoelectric beam having its ends connected to said support and said attachment member, respectively, electrodes secured to opposite faces of said beam, a target for receiving impinging forces, said target being supported by said attachment member and free to move in a direction perpendicular to said unflexed beam, said impinging forces causing compound flexure of said beam and voltages at said electrodes, and bilateral electromechanical transducing means coupled between said support and said attachment member whereby said attachment member and said target can be driven in a direction perpendicular to said unflexed beam.

14. A force transducer comprising a support, an attachment member, a flexible piezoelectric beam having its ends secured normal to said support and said attachment member, respectively, said attachment member having a longitudinal axis at the portion wherein said beam is secured, electrodes secured to opposite faces of said beam, a target for receiving impinging forces, said target being supported by said attachment member and the center of mass of said target being positioned on the perpendicular bisector of said beam, said impinging forces causing compound flexure of said beam, motion of said target and said attachment member and voltages at said electrodes, and said longitudinal axis remaining perpendicular to said beam end secured thereto as said attachment member is moved.

15. A transducer as claimed in claim 14 wherein said target has a planar face, said face remaining normal to said longitudinal axis when said beam is flexed.

16. A force transducer comprising a support, an attachment member having a longitudinal axis, a flexible piezoelectric beam having its ends connected to said support and said attachment member, respectively, said longitudinal axis being orthogonal to said beam, a target adapted to receive impinging forces, said target being supported by said attachment member, said impinging forces causing movement of said target, compound flexing of said beam and voltages at said electrodes, means for driving said target, said means comprising piezoelectric means connected between said support and said attachment member and a voltage source coupled to said piezoelectric means.

17. A transducer as claimed in claim 16 wherein said target has a planar face which remains normal to said longitudinal axis when said beam is flexed.

18. A transducer as claimed in claim 17 wherein said attachment member has a bore therethrough, a rod fastened to said support, said rod penetrating said bore, and said bore being slightly larger than said rod to enable limited motion of said attachment member before said rod is contacted.

19. An electromechanical transducer comprising a support, a force target, a piezoelectric beam having electrodes on opposite surfaces thereof, means for connecting one end of said beam to said support, means for connecting the other end of said beam to said target, the center of mass of said target being positioned on the perpendicular bisector of said beam, said beam and said connecting means being so arranged that movement of said target is directed toward linear motion parallel to said bisector, said movement causing compound flexure of said beam and a voltage at said electrodes.

20. A micrometeoroid detector comprising a support, a micrometeoroid target, a piezoelectric beam having electrodes on opposite surfaces thereof, means for connecting one end of said beam to said support, means for connecting the other end of said beam to said target, the center of mass of said target being positioned on the perpendicular bisector of said beam, said beam and said connecting means being so arranged that impingement of micrometeoroids on said target causes linear motion of said target parallel to said bisector, a compound curving of said beam, and a voltage at said electrodes.

References Cited by the Examiner

UNITED STATES PATENTS

| | | | |
|---|---|---|---|
| 2,175,021 | 10/1939 | Gibbs | 310—8.6 X |
| 2,359,245 | 9/1944 | Ritzmann | 73—71.2 |
| 2,597,005 | 5/1952 | Kendall | 73—1 |
| 2,728,222 | 12/1955 | Becker et al. | 73—105 |
| 3,043,921 | 7/1962 | Hester | 310—9.8 X |
| 3,047,823 | 7/1962 | Ranky | 333—72 |
| 3,067,345 | 12/1962 | Harris | 310—8.6 |
| 3,074,034 | 1/1963 | Crownover | 333—72 |
| 3,115,588 | 12/1963 | Hueter | 310—8.6 |
| 3,180,139 | 4/1965 | Soderholm | 73—141 |
| 3,199,345 | 8/1965 | Shih-Ying Lee et al. | 73—141 |
| 3,203,223 | 8/1965 | Petrow | 73—1 |
| 3,224,263 | 12/1965 | Rogallo | 73—142 |

FOREIGN PATENTS 604,663   10/1934   Germany.

RICHARD C. QUEISSER, *Primary Examiner.*

C. A. RUEHL, *Assistant Examiner.*